Feb. 25, 1936.  J. P. E. POILLOT  2,031,852
METER FOR LIQUIDS
Filed June 27, 1934
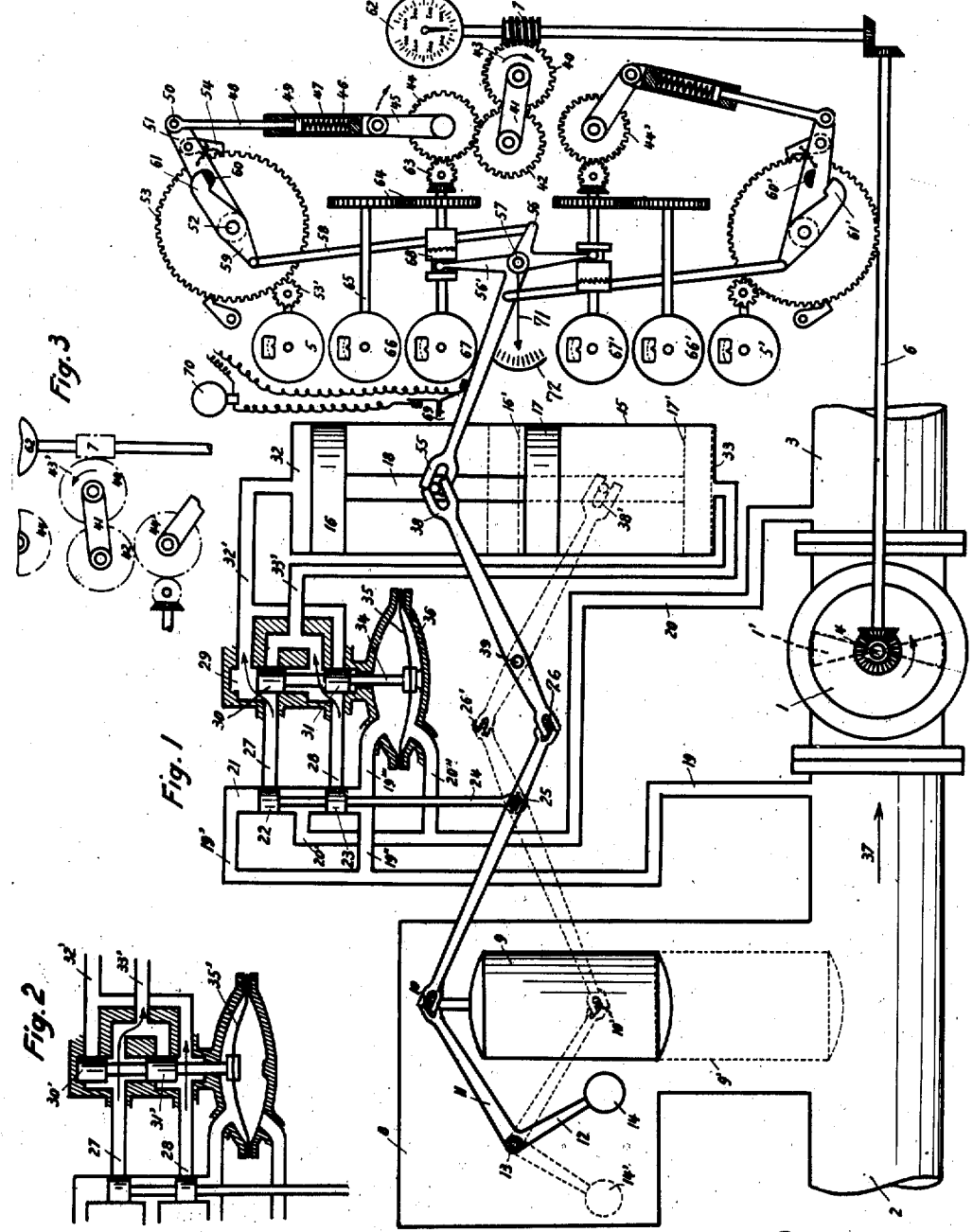
Inventor:
Jean, Pierre, Edmond Poillot
By Williams, Bradbury, McCaleb & Hinkle
Attys.

Patented Feb. 25, 1936

2,031,852

UNITED STATES PATENT OFFICE 2,031,852

METER FOR LIQUIDS

Jean Pierre Edmond Poillot, Chemin de la Fouilleuse, Saint Cloud, France, assignor to Etablissements Pompes Guinard (Pompes Guinard & Etablissements Cohendet Reunis), Chemin de la Fouilleuse, Saint Cloud, France, a corporation of France Application June 27, 1934, Serial No. 732,556
In France July 4, 1933

4 Claims. (Cl. 73—167)

Volumetric meters for indicating the quantity in volume of a fluid, for instance, of a liquid, during the filling or the emptying of a tank are generally constituted by a chamber which receives the liquid, is filled therewith, and then is evacuated, the operation of the movable parts of the chamber (for instance a hydraulic motor) being employed for actuating a register (calibrated in volume) indicating how many times the metering chamber has been filled and emptied.

The results thus obtained would be precise only if the liquid had always the same density. This is, however, not always the case, because of the variations of temperature. This drawback is particularly serious in the case of highly expanding liquids with irregular expansion coefficients, such as oils, petrols, petroleums, alcohols and the like.

Furthermore, when a tank-ship is charged with oil in one port and is being discharged in another port of a different geographical latitude, the density of the oil will vary with the geographical latitude, and if it is desired to have an exact metering by weight of the transported oil, it is necessary to compensate for this variation.

The problem consisting in taking into account the variation of the density of fluids in apparatus, metering the delivered amount of these fluids is known and various solutions have already been proposed.

It has particularly been proposed in meters for gases to provide a transmission of variable ratio between the metering flow responsive means and the register, the transmission being actuated by devices subjected to the influence of various factors on which depends the density of the gas to be metered.

In such known apparatus, the variation of the ratio of transmission is usually accomplished by a series of combined correcting devices each controlled by one of the factors influencing the fluid to be metered, particularly by the pressure of the gas, the atmospheric pressure, etc. In other known apparatus, the controlling member is constituted by a membrane, which is more or less deflected according to the pressure of the gas.

While such apparatus give the necessary results for gases, they cannot do this for liquids because of the practically total incompressibility of these. The indications would not, therefore, be exact.

For metering liquids, known apparatus use the subjection of the varying transmission ratio to a correcting device controlled by the temperature of the liquid, for instance by a thermostat. But such apparatus cannot give complete results either, as the density of a liquid varies not only in function of its temperature, and the kind of apparatus mentioned would provide the same indications for liquids of different densities but identical temperatures.

The present invention provides a remedy for these drawbacks by bringing a complete solution to the problem. This is obtained by equipping the meter for liquids with a correcting member, the operation of which depends directly upon the density of the metered liquid and not the temperature.

The invention is characterized in that the correcting member is constituted by a float sunk into the liquid to be metered, and equilibrated therein, the displacements of said float in respect of a predetermined position, and which are caused by variations in density of the liquid to be metered, controlling a variable speed ratio device inserted between the movable member of said meter and its register.

According to a preferred embodiment of the invention, a float is balanced by a counterweight eliminating the influence of the geographical latitude and bringing into action, under the effect of the weak efforts to which it is subjected, a hydraulic servo-motor controlling the transmission with variable gear-ratio. This servo-motor operating under the action of the liquid to be metered, as well as the transmission with variable ratio are preferably arranged in a manner to be subjected also to the action of the float in the case where the meter for liquids is of the type capable of operation with liquids flowing in two directions (particularly of the type having a reversible motor).

The float may also control other additional apparatus useful for the satisfactory operation of the installation, as will be seen in the following.

Other details of the invention and its advantages will be hereinafter explained with reference to the description of a preferred embodiment given by way of example and illustrated in the annexed drawing.

Figure 1 is a diagrammatic view of the entire meter and of all its accessory devices.

Figure 2 shows a detail of the servo-motor with its member in a position different from that of Figure 1.

Figure 3 shows a detail of the motion transmission between the motor and the register, with one of its members in a different position than that of Figure 1.

The metering flow responsive means, constituted by a hydraulic motor 1, is mounted in the piping 2—3. The shaft 4 of the motor transmits its motion to a weight register 5 (shown at the upper right hand portion of Figure 1), by means of a transmission shaft 6, of a shaft carrying a worm wheel 7 and of a transmission of variable ratio, the arrangement of which will be hereinafter indicated. In the piping 2—3 of the motor a tank 8 is disposed (which may be constituted by the piping 2—3 itself) entirely filled with liquid, inside of which may move a float 9. This float is pivoted at 10 to the end of a lever 11—12 bent at right angles and pivoted at 13 on a ball bearing. The second branch 12 of this bent lever carries a counterweight 14.

This float 9 controls the adjustment of the transmission of variable ratio disposed, as has been indicated, between the motor 1 and the weight register 5. This control is effected by means of a single servo-motor, it being necessary, in order to maintain sensitivity, to demand only a very small amount of work from the float 9. This servo-motor is constituted as follows: two pistons 16, 17 connected by a rod 18 may move in a cylinder 15. In order to subject this power-piston 16, 17 to the displacements of the float 9, pipings have been disposed at the two ends of the cylinder 15, by which said cylinder is brought into communication with two tappings 19 and 20 taken on the piping 2—3 on either side of the motor 1. These two tappings 19, 20 lead to a small cylinder 21 containing a distributing slide-valve comprising two pistons 22, 23, the rod of which is articulated at 25 to a lever 10—26 operated itself by the float 9. One of the tappings 19, communicates by conduits 19', 19" with the two ends of the cylinder 21, while the other tapping 20 communicates by the conduit 20' with the middle of said cylinder. From the cylinder 21, two pipes 27, 28 lead to the chamber of distribution 29 of a reversing slide-valve with two pistons 30, 31 adapted to invert (for a given position of the distributing slide-valve 22, 23) the connections between the pipes 27, 28 coming from the distributing valve 22, 23 and the two ends 32, 33 of the power cylinder 15, in order that these ends should always receive in the same manner at one given end, the pressure existing before the motor 1, and at the other end, the pressure existing beyond said motor, notwithstanding the change of direction of the flow of liquid which may have been brought about in the piping 2—3.

The control of the inverting slide-valve 30—31 is briefly as follows: its rod 34 is connected to an elastic membrane 35 housed in a chamber 36. One of the faces of the membrane, the top face in the drawing, communicates with the tapping 19 by means of a piping 19''', while the lower face of the membrane communicates with the tapping 20 by means of a piping 20''. In the case illustrated, the direction of flow of the liquid in the piping 2—3 is assumed to be that of the arrow 37. The pressure above the motor 1, i. e. the higher pressure, is thus transmitted through the tapping 19 to the upper face of the membrane 35 which takes the position shown in Figure 1. The position of the valve 30—31 then provides communication between the pipe 27 and the upper end 32 of the power cylinder 15, and between the pipe 28 and the lower end 33 of said cylinder, according to the two arrows of the figure.

On the contrary, if the flow of the liquid in the piping 2—3 were in the opposite direction to the arrow 37, the pressure existing above the motor would be transmitted through the tapping 20 and would act upon the lower face of the membrane 35. The latter would then take the position 35' shown in Figure 2. The inverting valve 30—31 would then take the position indicated as 30'—31' in Figure 2 and provide communication between the pipe 27 and the pipe 33' leading to the lower end of the power-piston, at the same time providing communication between the pipe 28 and the pipe 32' leading to the upper end of the power-piston, as shown by the arrows of Figure 2.

For subjecting the displacements of the power-piston 16—17 to those of the float 9, these two members are connected by a lever 38—26 pivoted at a fixed point 39 of the frame (symmetrical to the axis 25 with respect to the articulation 26), actuated at one end 38 by the power-piston 16—17 and articulated at the other end, at 26, to the lever 10—26 controlled by the float 9, the latter lever being articulated, as already stated on the rod 24 of the distributing valve 22—23.

The subjecting is thus realized in the following manner:

The float 9 and its balancing counterweight 14 are adapted in such a manner that, for a liquid having the mean density of the liquids for which the apparatus is destined, for instance the mean density of petroleums, oil, etc., the branch 11 of the lever is horizontal. In this position the lower branch 12 is vertical and the counterweight 14 does not exert any action on the float. If the apparatus is then utilized for a liquid of higher density, the float receives a stronger upward thrust from the liquid and moves upward until the mechanical moment which it exerts on the bent lever 11—12 is balanced by the moment exerted by the counterweight 14 deviated from the vertical. This corresponds, for instance, to the position of the float 9 and of the counterweight 14 shown in full lines in the drawing. On the contrary, if the liquid to be metered has a lower density, the float will come, for instance, to the position 9' and the counterweight to the position 14' shown in dotted lines, the equilibrium being established under the same conditions as above. Therefore, to each density there corresponds a particular state of equilibrium and a particular position of the float.

It may be easily seen that the position of the power-piston 16—17 will always correspond to that of the float 9. If it is assumed, for instance, that the float being in its lower position 9' and consequently the power-piston being also in its lower position 16'—17' shown in dotted lines, the density of the liquid should increase, the float 9' will rise and the lever 10'—26', articulated at 26', which has not yet moved, will cause the slide-valve 22—23 to rise. The pressure above the motor 1 will be transmitted through the pipings 19, 19", 28, 33' to the lower end 33 of the power cylinder 15, while the pressure beyond the motor 1, coming through the tapping 20, will be transmitted through the pipings 20', 27 and 32' to the upper end 32 of the cylinder. The pressure above the motor being the stronger, the power-piston 16'—17' will thus be lifted until the resulting lowering of the articulation 26' brings the distributing valve 22—23 back to the closing position. When the equilibrium has been established, the power-piston 16'—17' will be positioned due to the linking 10'—26'—38', to the pivot 39 and to the valve 22—23, in the position corresponding to that of the float.

An exact servo-system is thus obtained between the float 9 and the power-piston 16—17, this servo-system operating in the same manner whatever may be the direction of flow in the piping 2—3 of the motor and this, due to the inverting valve 30—31.

The variable ratio transmission between the motor 1 and the register 5 controlled by the power-piston 16—17 is briefly arranged in the following manner: the motion of the shaft 4 of the motor is transmitted as mentioned above by means of an intermediate shaft 6, to a worm wheel 7. This worm wheel meshes with a toothed wheel 40 driving by light friction a lever 41 carrying the axle of a pinion 42 meshing with pinion 40. In the neighborhood of the pinion 42 lies another pinion 44 which may be brought into mesh with the pinion 42 if the direction of rotation of the pinion 40 indicated by the arrow 43 is suitable. The pinion 44 is integral with a crank 45 on which is articulated a connecting rod constituted by a tubular part 46 containing a spring 47. A rod 48 having a piston 49 at its end may slide within this tubular part 46. This sliding connecting rod is coupled at 50 to an oscillating arm 51 freely pivoted at 52 to the shaft of a ratchet wheel 53. This oscillating arm 51 is provided with a pawl 54. It will be seen that when the pinions 42 and 44 are in mesh, the system formed by the connecting rod 46—48 and the crank 45, produces oscillation of the lever 51 and pawl 54, so that the latter, in its descending stroke, makes the ratchet wheel 53 turn by an amount corresponding to the angle through which it oscillates. The connecting rod 46—48 being formed by two sliding parts, it will be possible to modify the value of the angle of oscillation of the lever 51 and pawl 54 and consequently the speed of rotation of the ratchet wheel 53 by varying the length of the sliding connecting rod 46—48 during the upward movement thereof. This is obtained by the control, by means of the power-piston 16—17, of the following device: on this piston 16—17 is articulated a lever 55—56 pivoted at a fixed point 57 of the frame. At the end 56 is linked a connecting rod 58 the other end of which is coupled to a small lever 59 pivoted freely to the shaft 52 of the ratchet wheel 53. The lever 51 is provided with a lug 60 while the end 61 of the lever 59 acts as an upper stop for this lug. By way of example, when the power-piston 16—17 is in the position shown in full lines in the drawing, the corresponding position of said stop 61 prevents the lever 51 and pawl 54 from rising above their position shown in full lines in the figure, and which corresponds to a determined compression of the spring 47 carried by the sliding connecting rod 46—48, that is to say, to a determined shortening of said connecting rod. If the power-piston 16—17 moves downward, this corresponding to the passage of a liquid of lower density, the stop 61 also lowers and the upward amplitude of the oscillation of the lever 51 and the pawl 54 is decreased, so that the rotation transmitted to the weight register 5 by means of this ratchet 53 and by the intermediate pinion 53' is reduced for a given rotation of the shaft 4 of the motor 1, i. e., for a given volume of the liquid passing through the motor.

The apparatus is further arranged in a manner to give immediately other useful indications. For instance, the shaft of the worm 7 drives directly a tachometer 62 adapted to rotate in two opposite directions, said tachometer indicating the instantaneous rate of flow in one direction or the other and indicating also the direction in which this flow takes place. As pinion 44 is situated before the connecting rod 46—48, the speed of its rotation depends solely on that of the shaft 4 of the motor 1, and this motion is transmitted to a volume register 66 by means of a set of bevel pinions 63, gear wheels 64 and the shaft 65.

In tanks for oils, petroleums, etc., it often happens that a more or less important amount of water or other light liquids is mixed with the product. The metering apparatus is arranged in a manner to indicate the passage of such a foreign liquid of determined density through the motor 1 and to give its instantaneous rate of flow and its volume registration. The latter is obtained by the following means: a set of bevel pinions 63 also controls a second volume register 67 for the considered liquid of determined density, by means of a coupling, the movable part 68 of which is operated by the arm 56' of the lever 55—56 actuated by the power-piston 16—17. Thus this coupling becomes effective only for a predetermined position of the piston 16—17, i. e. during the passage of a liquid of determined density, for instance, in the case of the figure, for a liquid of the highest density, corresponding to the uppermost position of the piston 16—17.

When the lever 55, 56 brings the coupling 68 into operative contact, it also actuates an electric switch 69 causing the operation of a signaling device 70 so that the attendant may be immediately advised of the passing of the determined foreign liquid.

The attendant upon hearing the alarm may observe the instantaneous rate of flow of the foreign liquid by means of the tachometer 62 which will indicate this at such time.

In most of the applications, it is useful to be able to meter separately the liquids charged and discharged from the tank to which the meter is applied. For this purpose the whole set of meters 5, 66, 67 and their variable or fixed ratio transmissions, as shown in the upper part of Figure 1, is symmetrically reproduced as shown in the lower part of said figure by 5', 66' and 67'. The control of these registers 5', 66', 67' is insured by a pinion 44' placed symmetrically to the pinion 44 with respect to the fixed pinion 40. Thus, the movable pinion 42 carried by the lever 41 and pivoted with light friction to the shaft of the fixed pinion 40, comes into mesh (Figure 3) with the pinion 44' and actuates the whole set of the lower registers 5', 66', 67' when the direction of flow in the piping 2—3 is opposed to the arrow 37 and when, consequently, the pinion 40 turns in the opposite direction to the arrow 43.

A hand 71 fixed to the lever 55—56 indicates, by its displacements in front of a graduated scale 72, the density of the metered liquid.

An apparatus thus constituted is particularly adapted to practical conditions of use as it allows as has been shown above:

1. To measure and indicate the weight and volume of the principal liquid which is being handled.

2. To detect by means of a signaling device the passage of a different liquid of determined density.

3. To meter and to indicate separately also the delivered amount of this different liquid.

4. To effect these meterings and indications by weight and by volume in each direction of flow of the liquid through the meter.

5. To indicate the direction of the passage of the liquid through the meter.

6. To indicate by direct reading the instantaneous rate of flow.

7. To make (if the balancing of a float is obtained by means of a counterweight) meterings and indications independent of the geographical latitude.

8. To indicate the density of the liquid metered.

What I claim is:

1. Meter for liquids capable of metering the weights of liquids of varying densities, particularly of liquids with irregular expansion coefficients, such as oils, petrols, petroleums and alcohols, comprising flow responsive means having a movable member in said means, a correcting device consisting in a float sunk into the liquid to be metered, a counterweight and means for balancing said float by said counterweight, a register, a transmission with variable ratio inserted between the movable member of said flow responsive means and the register, a hydraulic servo-motor comprising a power member driven by the pressure of the metered liquid, means for controlling said servo-motor by said correcting device, and means whereby said servo-motor is made to vary the ratio of the transmission.

2. Meter for liquids capable of metering the weights of liquids of varying densities, particularly of liquids of irregular expansion coefficients, comprising a reversible hydraulic motor, a float sunk into the liquid to be metered, a counterweight and means for balancing said float by said counterweight, a register, a transmission with variable ratio inserted between the motor and the register, a hydraulic servo-motor comprising a power member driven by the pressure of the metered liquid, means whereby the pressure of the liquid is made to act in the same direction upon said power member whatever the direction of flow of the liquid through the motor, said means comprising a distributing slide-valve and an inverting device, means for controlling said servo-motor through the displacement of the balanced float, and means whereby said servo-motor is made to vary the ratio of the transmission.

3. Meter for liquids capable of metering the weights of liquids of varying densities, particularly of liquids with irregular expansion coefficients, comprising a hydraulic motor driven by the metered liquid, a register, a transmission device between said register and said motor, said device comprising a ratchet wheel, an oscillating lever with a pawl driving said wheel, and a telescopic connecting rod driven by the motor and acting upon said lever, a correcting device comprising a float sunk into the liquid to be metered, a counterweight and means for balancing said float by said counterweight, and means for varying the amplitude of the oscillating lever driving the ratchet wheel according to the position of the float, said means comprising a movable stop connected to said float.

4. Meter for liquids capable of metering the weights of liquids of varying densities, particularly of liquids with irregular expansion coefficients, comprising a reversible hydraulic motor driven by the metered liquid, two registers, two transmissions with a variable ratio inserted between said motor and said registers, means for driving one transmission when the liquid flows in one direction through the motor, means for driving the other transmission when the liquid flows in the opposite direction, a correcting device compising a float sunk into the liquid to be metered, a counterweight and means for balancing said float by said counterweight, and means for controlling the speed ratios of said transmissions by the displacement of said float.

JEAN PIERRE EDMOND POILLOT.